United States Patent [19]

Faroudja

[11] Patent Number: 4,504,853

[45] Date of Patent: Mar. 12, 1985

[54] ENHANCEMENT OF QUADRATURE MODULATED CHROMA BY LUMINANCE OR CHROMA TRANSITIONS WITHOUT CHROMA DEMODULATION

[76] Inventor: Yves C. Faroudja, 26595 Anacapa Dr., Los Altos Hills, Calif. 94022

[21] Appl. No.: 349,017

[22] Filed: Feb. 16, 1982

Related U.S. Application Data

[63] Continuation-in-part of Ser. No. 325,038, Nov. 25, 1981, abandoned.

[51] Int. Cl.³ .................... H04N 5/21; H04N 9/535
[52] U.S. Cl. .................................... 358/37; 358/36; 358/40
[58] Field of Search .............. 358/35, 36, 37, 39, 358/40, 166, 167, 162

[56] References Cited

U.S. PATENT DOCUMENTS

| | | | |
|---|---|---|---|
| 4,030,121 | 6/1977 | Faroudja | 358/37 |
| 4,181,917 | 1/1980 | Richman | 358/36 |
| 4,331,971 | 6/1982 | Bretl | 358/37 |

Primary Examiner—Tommy P. Chin
Attorney, Agent, or Firm—David B. Harrison

[57] ABSTRACT

A color television processing system enhances aperiodic transitions occurring in a quadrature modulated subcarrier by deriving a control signal from simultaneously occurring aperiodic transitions in the baseband of the carrier, such as luminance (or from chrominance in the absense of an effective luminance transition) without demodulation of the chroma subcarrier. The system includes an input, a delay match for delaying a first component of the modulated subcarrier signal by a predetermined amount, a one-half period delay for delaying a second component of the modulated subcarrier signal by half the period thereof, and a first adder for combining in equal amounts a third component of the modulated subcarrier with the delayed second component thereof to provide a transition envelope. A control generator receives the baseband signal and chroma and derives a control signal from transitions occurring in the baseband or in chroma in the absence of baseband transitions. A multiplier multiplies the transition envelope signal by the control signal to provide an enhancement product. A second adder combines the delay matched first component in phase with the enhancement product to put out the enhanced modulated subcarrier characterized by shortened transitions in alignment with simultaneous transitions in the baseband. An active chroma phase equalizer for processing the chroma sidebands is also disclosed.

34 Claims, 10 Drawing Figures

CHROMA PHASE EQUALIZER

GATE

ENHANCEMENT OF QUADRATURE MODULATED CHROMA BY LUMINANCE OR CHROMA TRANSITIONS WITHOUT CHROMA DEMODULATION

This application is a continuation-in-part of U.S. patent application Ser. No. 06/325,038, filed Nov. 25, 1981, now abandoned.

BACKGROUND OF THE INVENTION

This invention relates to enhancement of aperiodic transitions in a subcarrier modulated signal by reference to similar transitions in the baseband. More particularly, this invention relates to enhancement of quadrature modulated chroma of a composite color television signal by reference to luminance transitions in the signal (or chrominance transitions only in the absense of luminance transitions) and without demodulation of the quadrature modulated chroma subcarrier.

There is a recognized need to sharpen the images of television signals, particularly at transition edges where the picture changes brightness or color or, more commonly, both brightness and color. In television signal formats such as NTSC and PAL, the color information is encoded on a subcarrier which is interleaved with the baseband luminance information, so that black and white television receivers will operate acceptably upon the color signal. An inherent drawback of these formats is the limited bandwidth accorded to the color information component, called "chroma" or "chrominance". It occupies only about one third to one sixth of the bandwidth which is given to the brightness or "luminance" component in the baseband.

There are many opportunities in a color television system for the chroma information to become degraded, particularly at transitions from one hue to another. For example, this degradation has become particularly noticeable in connection with video tape and cassette recorders now widely available in the consumer marketplace.

In television pictures which depict reality, as opposed to electronically generated cartoons, titles, etc., there is a very high statistical correlation between changes in luminance and changes in chroma. This correlation has been used to great advantage to enhance or "crispen" chroma by prior art techniques.

One approach for crispening chroma is set forth in the present applicant's prior U.S. Pat. No. 4,030,121, entitled "Video Crispener". Therein, applicant discussed the prior art approaches taken by others at the time he made the invention disclosed there, and he proposed a system which, among other things, crispened chroma transitions by developing a correction signal from the luminance component. That approach, depicted in FIG. 9 of that patent and discussed in connection with that figure, called for demodulating the chroma subcarrier into its two (I and Q) components, separately enhancing the components in the demodulated baseband and then remodulating the components into the requisite color subcarrier before it could be recombined with the luminance to provide the enhanced color composite signal.

The approach depicted in U.S. Pat. No. 4,030,121 worked very well, and many units were sold which incorporated that invention. It did an excellent job of making the chrominance transition of shorter duration whenever a luminance transition was present, and it corrected chroma-to-luminance delay errors occuring prior to enhancement by realigning the chroma transition precisely with the luminance transition.

While applicant's prior approach was effective, it was very complex and expensive, and had stringent alignment requirements throughout the circuitry thereof. For example, it had about eight separate controls which interacted during the alignment process. Because of those difficult alignment constraints and the high cost of the prior approach, a need has arisen for a system which achieves the same result as the prior approach but without the complexity associated with demodulation and remodulation of the quadrature modulated chroma subcarrier.

Another drawback of the prior art approach was that in some instances the luminance transition was of an amplitude too low to yield a correction signal for a corresponding chroma transition. In such circumstances the chroma transition remained unenhanced.

OBJECTS AND SUMMARY OF THE INVENTION

A general object of the present invention is to provide an improved method and apparatus for enhancing chroma transitions in a quadrature modulated color television signal with luminance transitions or with chroma transitions when the luminance transitions are too low, and without demodulation of the quadrature modulated chroma subcarrier.

Another object of the present invention is to reduce the rise time of chroma transitions by reference to corresponding luminance transitions, without demodulation of the quadrature modulated chroma subcarrier.

Another object of the present invention is to reduce significantly the complexity of circuitry required to enhance chroma transitions in a quadrature modulated color television signal to improve the quality of the reproduced picture images.

A further object of the present invention is to provide automatic luminance-chrominance delay tracking so that the chroma transitions coincide with the luminance transitions.

One more object of the present invention is to achieve a color television system which is characterized by a low initial chroma bandwidth and limited chroma to luminance crosstalk and which yields red, green and blue color components without noticeable artifacts due to the chroma bandwidth limitation.

Yet another object of the present invention is to provide a chroma enhancement method and apparatus which is applicable to bidimensional and tridimensional video processing and to systems having very low chroma data flow, such as those proposed systems calling for chroma to be sent only every other luminance field and the like.

Still one more object of the present invention is to use a chroma transition as the reference signal for enhancement when, and only when the corresponding luminance signal is too weak to provide a realiable enhancement reference signal.

Still another object of the present invention is to provide a unique chroma phase equalizer circuit at the chroma input to avoid or reduce overshoot without excessive loss of bandwidth and without increasing rise-time.

A still further object of the present invention is to provide a simplified method and apparatus for enhancing chroma at reduced cost and with increased reliability and simplicity in use.

These objects are achieved in a system which enhances aperiodic transitions occurring in a quadrature modulated subcarrier, such as the quadrature modulated color subcarrier used in color television systems, by derivation of a control signal from simultaneously occurring aperiodic transitions in the baseband of the carrier, such as luminance, and without any need for demodulation of the subcarrier.

The system includes an input, a delay match connected to the input for delaying a first component of the modulated subcarrier signal by a predetermined amount, a one-half period delay connected to the input for delaying a second component of the modulated subcarrier signal by half the period thereof, and a first adder connected to the input and to the one-half period delay for combining in equal amounts a third component of the modulated subcarrier with the delayed second component thereof to provide a transition envelope. The transition envelope signal may also be obtained by other methods and means.

A control generator is connected to receive the baseband signal and to derive a control signal from transitions occurring in the baseband. A multiplier is connected to the first adder and to the control generator, and it multiplies the transition envelope signal by the control signal to provide an enhancement product. A second adder connected to the delay match and to the multiplier combines the delay matched first component in phase with the enhancement product to put out the enhanced modulated subcarrier characterized by shortened transitions in alignment with simultaneous transitions in the baseband.

A bandpass filter may be included at the input to eliminate ringing and other unwanted artifacts prior to enhancement processing. In addition to the bandpass filter, or in lieu thereof, a unique phase equalizer circuit may be employed to eliminate ringing or overshoot without bandwidth reduction or increase of rise time.

The control generator may include a gate circuit which switches from luminance transitions to chroma transitions automatically, whenever the luminance transitions are too weak to provide effective enhancement references, and when the chroma transitions are at or above a substantial minimum level.

The method of the present invention is summarized by the the following steps:

a. dividing the modulated subcarrier signal into a first component, a second component and a third component;

b. delaying the second component by a period equal to one half the period of the modulated subcarrier;

c. generating a chroma transition envelope signal by for example, combining the delayed second component and the third component in equal measure so that they phase cancel each other except during transitions, d. deriving a control signal from a corresponding transition occurring in the carrier baseband signal;

e. multiplying the transition envelope signal by the control signal to provide an enhancement product;

f. combining in phase the first component and the enhancement product to provide the modulated carrier signal with enhanced transitions characterized by shortened transition time and by alignment with simultaneously occurring transitions in said carrier baseband signal.

The method may also include the further step of bandpass filtering the subcarrier signal prior to its division into three components to eliminate ringing and other unwanted artifacts otherwise accompanying transitions therein. This step may include or comprise phase equalizing the subcarrier signal to achieve the same results without excessive loss of bandwidth and without increasing rise-time.

The method may also include the step of deriving a control signal from chroma transitions above a predetermined level, only when the corresponding luminance-based control signal is too weak.

These and other objects, advantages and features will become apparent to those skilled in the art from a consideration of the following detailed description of a preferred embodiment presented in conjunction with the accompanying drawings.

DETAILED DESCRIPTION OF PREFERRED EMBODIMENTS

Figure 1:
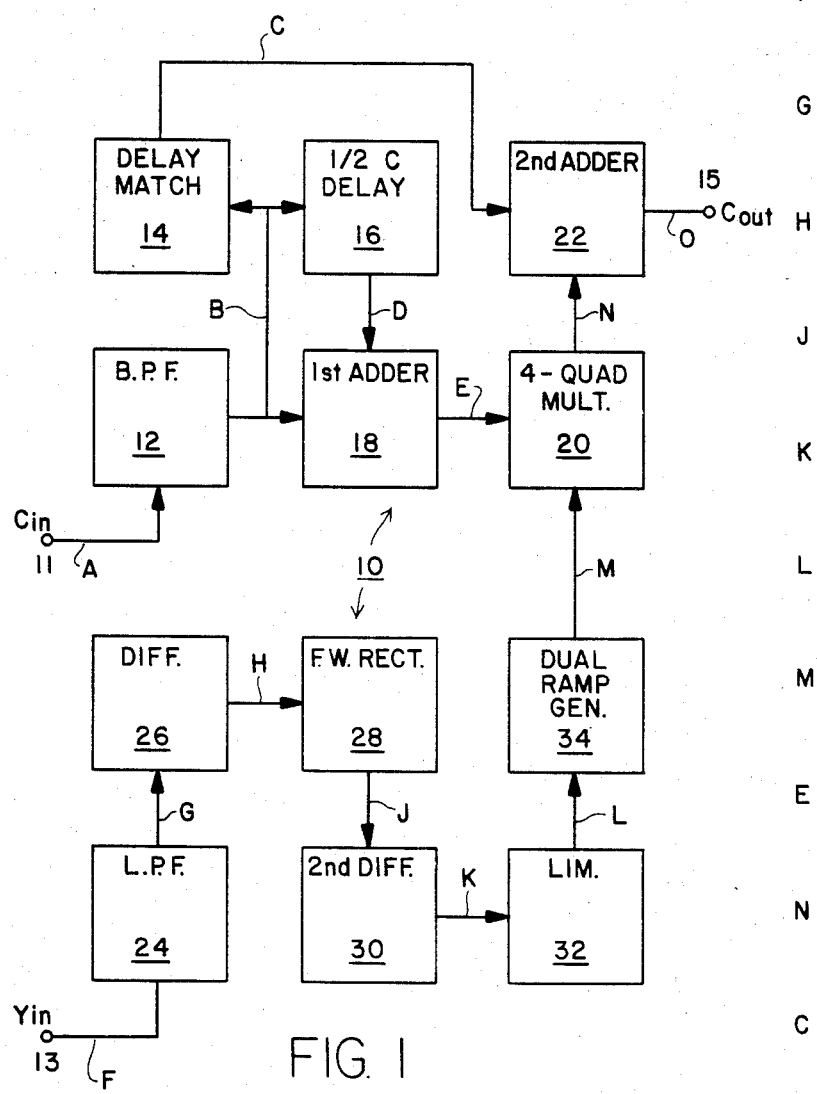
FIG. 1 is a block diagram of a system in accordance with the principles of the present invention.
Figure 2:
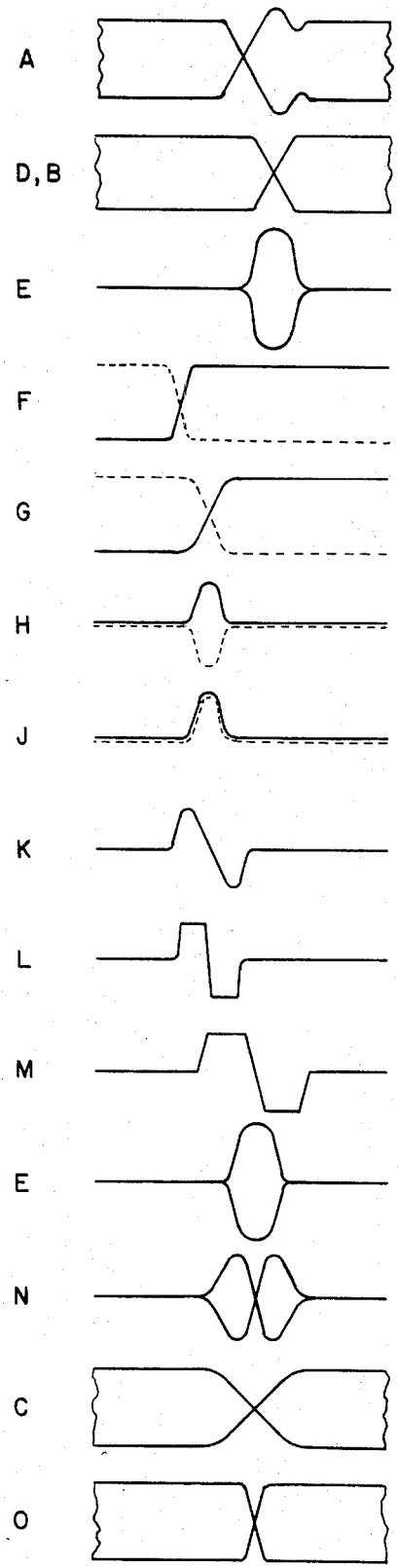
FIG. 2 is a set of related waveforms depicting the operation of the various elements set forth in FIG. 1.

A first embodiment 10 incorporating the principles of this invention is best understood in overview by reference to FIGS. 1 and 2 which correlate structure and function. Undemodulated chroma in a degraded state (FIG. 2A) is entered into the system 10 at a chroma subcarrier input 11. The chroma subcarrier may be 3.58 MHz with NTSC format color television, or it may be 4.46 MHz with PAL format. In either event the color subcarrier is quadrature modulated to yield a subcarrier which is interleaved with the baseband luminance in a manner which enables the color video to be reproduced by monochromatic video display devices.

As seen in waveform A of FIG. 2 the incoming chroma is undergoing a phase shift from e.g. green to magenta, a maximum color phase shift of 180 degrees. The depicted transition, typical of chroma put out by video cassette recorders and other devices which degrade chroma, is degraded in three important respects: the transition lags the luminance transition, the transition is too wide (on the order of one microsecond, rather than a desired 500 nanoseconds), and ringing has been introduced incident to the transition. Each of these deficiencies is corrected by the system 10 in response to luminance provided at a luminance input 13, so that the signal depicted as waveform O of FIG. 2 at the enhanced chroma output 15 is properly shaped, timed and aligned with the luminance.

The system 10 includes a bandpass filter 12 connected to the chroma input 11. The filter 12, centered in the chroma subcarrier bandpass, eliminates the ringing depicted in waveform A by creating an opposed phase ringing which self cancels the original ringing. The edges of the chroma bandpass are slightly rounded, and there is a slight increase in the transition duration, but this drawback is eliminated by the subsequent processing. This filter circuit 12 may be significantly improved by inclusion of the chroma phase equalizer depicted in FIG. 10, and discussed hereinafter.

The band pass filtered chroma is divided into three different paths or components. One path is through a delay matching network 14 which functions to delay the chroma signal by the requisite amount so that when it is combined with an enhancement component later on, it will be in exactly the correct phase relationship.

Another subcarrier path is through a one-half subcarrier period delay circuit 16 which is set to delay that component by exactly half the period of the subcarrier frequency. A third path is directly to a first adder circuit 18.

The first adder 18 combines waveforms B and D. Since they are out of phase by 180 degrees they cancel each other, except at transitions. When a transition occurs, such as the phase shift from green to magenta shown as waveform E, the adder 18 puts out a transition envelope which peaks when the maximum rate of phase or amplitude change occurs.

It is an important consideration of the system 10 that there be no group delay (phase) errors or amplitude errors in the delay circuit 16 and that it function in a completely linear mode to provide a truly symmetrical transition envelope signal as is depicted at waveform E. Other methods to obtain waveform E are also practical, such as using a combination of band-pass and band-reject filters.

The waveform E envelope signal is entered as one coefficient into a four-quadrant multiplier 20. The multiplier 20 may be of the monolithic integrated circuit variety, such as the type MC 1496G made by Motorola and others. A suitable multiplier circuit is depicted in FIG. 11 of applicant's prior U.S. Pat. No. 4,030,121, and will not be further described herein. The multiplier 20 receives a tri-level control signal, waveform M, derived from luminance, and multiplies it by the envelope signal, waveform E, from the first adder circuit 18. The resultant product, waveform N is then combined in a second adder circuit 22 with the delay matched chroma from the delay 14 to yield enhanced chroma, waveform O, at the output 15.

Derivation of the control signal will now be described. Luminance is supplied to the luminance input 13. The luminance, depicted as waveform F, is passed through a low pass filter 24 having a 3 db rolloff preset between 500 kHz and 1.5 MHz. The filter 24 functions to remove anything but the luminance transitions, and it makes those transitions very solid and well defined, free of noise and other high frequency elements. A low pass filtered luminance transition going from dark to light (and from light to dark in dashed lines) is depicted as waveform G. As can be seen, the filter 24 has increased the duration of the transition, and this increase is used to help recenter the chroma transition in alignment with the luminance transition which has entered first into the system 10 on account of preexisting group delays in the chroma path.

The low pass filtered luminance is then subjected to a first differentiation by a differentiator 26 to yield a pulse, waveform H, which corresponds in direction with the direction of the transition. As depicted in FIG. 2H the pulse is rounded and it is proportional to the amplitude of the luminance transition. The pulse is converted into an absolute value by a full wave rectifier 28, waveform J. The rectifier 28 also includes a threshold circuit which sets a minimum threshold value so that enhancement doesn't occur except in response to detected luminance transitions. The threshold is set at about one IRE unit or equivalent.

The absolute value transition pulse is passed through a second first-order differentiation circuit 30 which yields a second order differential of the absolute value of the luminance transition, waveform K, which is closely analogous to a single sinusoid having a positive-going first peak, followed by a negative-going second peak, followed by a return to zero value.

A limiting amplifier 32 is connected to limit the amplitude of the double pulse differential to a defined value. Thus, the output of the limiting amplifier 32, waveform L, is a three level pulse whose amplitude levels do not change even though the luminance amplitudes may vary from e.g. 10 IRE units to 100 IRE units. For levels below e.g. 1 IRE unit the limiting amplifier puts out no signal.

The three level pulse is further modified by passing through a dual ramp generator 34. Its function is to spread the transitions between the three levels over more time but in a very smooth and continuous fashion. The slope of the transitions determines the bandwidth of the enhanced chroma. If the slope is made very steep, the chroma bandwidth will be increased beyond the capability of some color display devices which cannot handle more than about 1 MHz of chroma bandwidth. However, for monitors having direct red, green and blue inputs, and for computer graphics and videotape to film transfer processes, and similar high bandwidth applications, the slope may be made very steep with excellent results. A slope providing about 1 MHz of chroma bandwidth is depicted relatively as waveform M of FIG. 2. It is important to note that waveform M is a function characterized by linear slopes and constant steady state values.

The effect of the tri-level control signal, waveform M, upon the transition envelope, waveform E, is shown as waveform N of FIG. 2. It is important that the multiplier 20 operate linearly so that the enhancement product, waveform N, is completely symmetrical. As depicted in FIG. 2N, the enhancement product differs from waveform E by having its transition gap considerably narrowed. Also, a phase inversion has occurred which is necessary to match the phase of the unenhanced chroma perfectly. The phase difference between the original chroma, waveform C, and the enhancement product, waveform N, is zero degrees plus or minus 10 degrees over the entire transition.

As can be seen by waveform O the enhanced chroma has had its duration shortened in half to about 500 nanoseconds; the ringing has been removed, and the transition has been recentered in alignment with the luminance transition.

Figure 3:
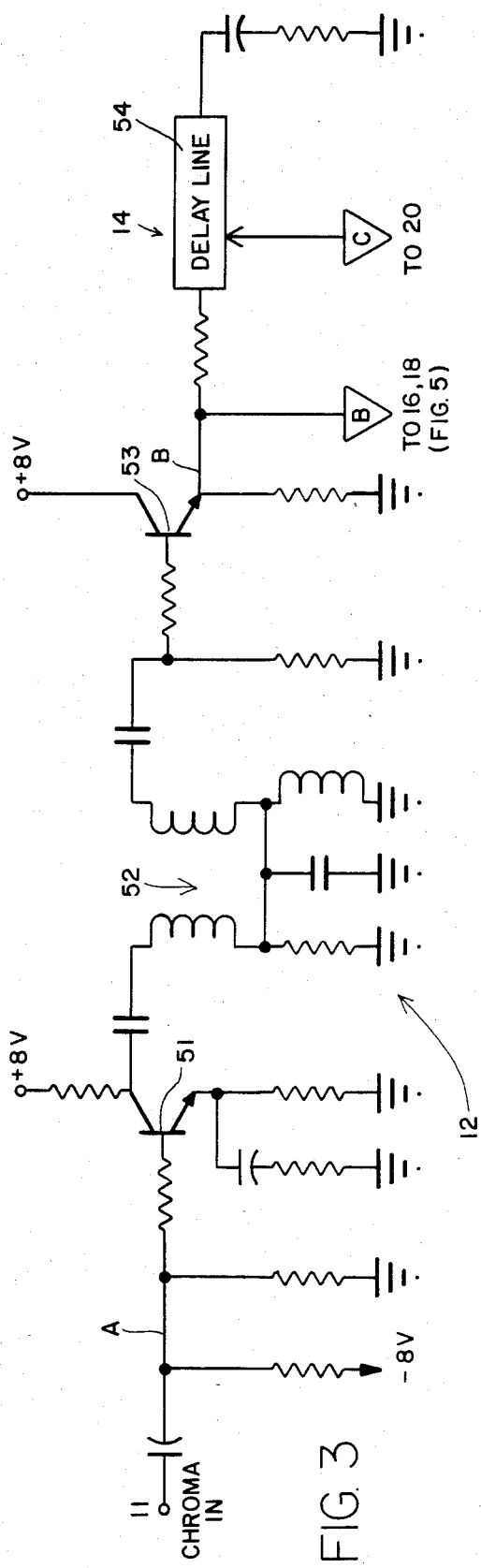
FIG. 3 is a schematic diagram of the band pass filter and delay match of the system set forth in FIG. 1.

Referring to FIG. 3, the chroma band pass filter 12 is connected with available components having values readily ascertained by those skilled in the art, and it includes a common emitter transistor 51 configured to amplify the chroma and pass it through a Tee filter 52 having a pass band centered at 3.58 MHz and being about 500 KHz wide at the 3 db rolloff point. The Tee filter 52 is connected to an emitter follower transistor 53 which puts out the band pass filtered chroma in three portions or components, one portion to a delay matching circuit 14 which may be implemented by a 500 nanosecond tapped glass delay line 54 terminated as shown, another portion to the one-half subcarrier period delay circuit 16, and a third portion to the first adder circuit 18.

Figure 4:
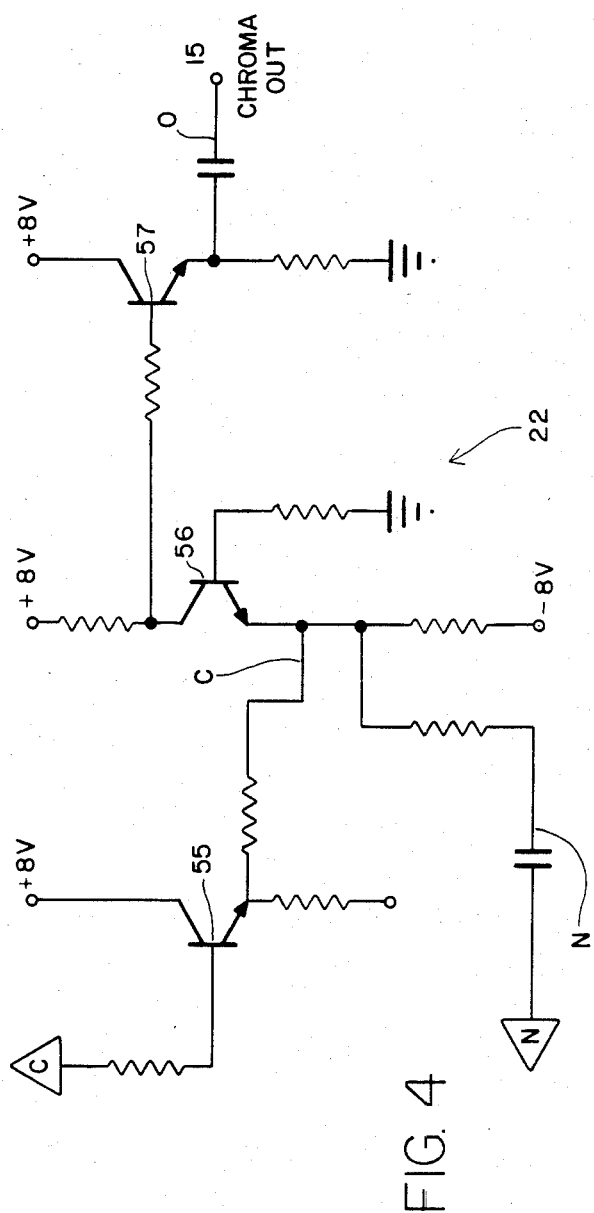
FIG. 4 is a schematic diagram of the the second adder element of the system set forth in FIG. 1.

An implementation of the second adder circuit 22 is set forth in FIG. 4 which shows the connection of the components thereof. An emitter follower 55 buffers the delayed and band pass filtered chroma, waveform C. Addition of the waveform C chroma and the waveform N enhancement product occurs in a transistor 56 by common connection to its emitter. The collector thereof is connected to drive an emitter follower 57 which puts out the enhanced chroma at the output 15 via a blocking capacitor.

Figure 5:
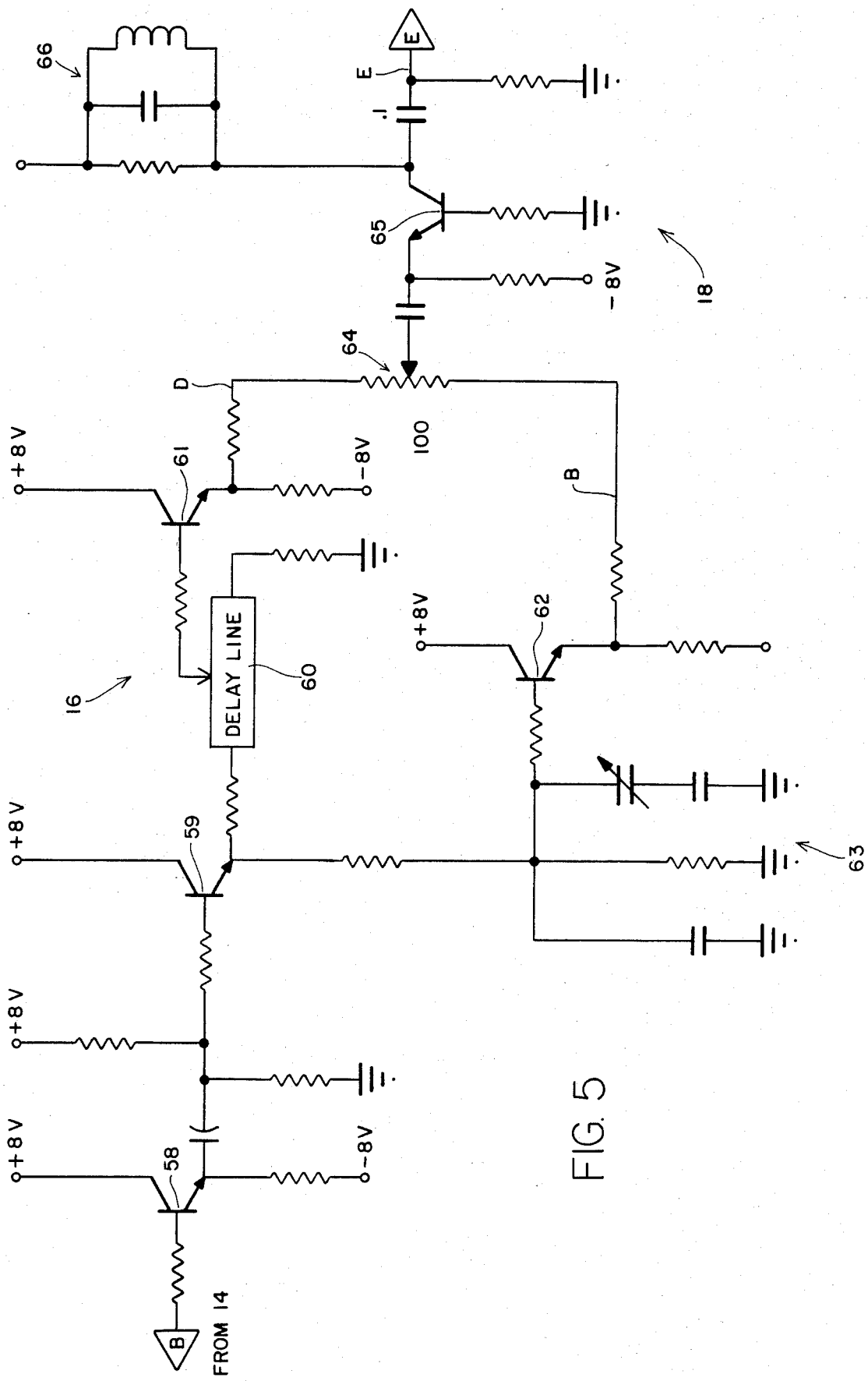
FIG. 5 is a schematic diagram of the one-half subcarrier period delay and the first adder elements of the system set forth in FIG. 1.

Circuitry for the one-half subcarrier period delay circuit 16 and the first adder circuit 18 is shown in FIG. 5 with the connections and components used. An emitter follower 58 receives the waveform B signal from the output of the band pass filter 12. The signal is then sent to the base of another emitter follower transistor 59 where it then is divided into two paths: one path is through a tapped delay line 60 (which provides for the one half cycle delay) and an emitter follower 61 having its base connected to a tap on the line 60. The output from the emitter of the transistor 61 is waveform D. The other signal path from the emitter of the transistor 59 is to the base of yet another emitter follower 62. The base of the transistor 62 is connected to a timing network 63 which includes a variable capacitor so that waveform D may be adjusted to lag behind waveform B by precisely 180 degrees. A potentiometer 64 is connected between the emitters of transistors 61 and 62. Its function is to enable precise amplitude balance between waveforms B and D. The wiper of the potentiometer is connected to the emitter of a common base transistor 65. The transistor 65 functions as the first adder circuit 18 and it includes a tuned circuit 66 in series with its collector to increase signal amplitude.

Figure 6:
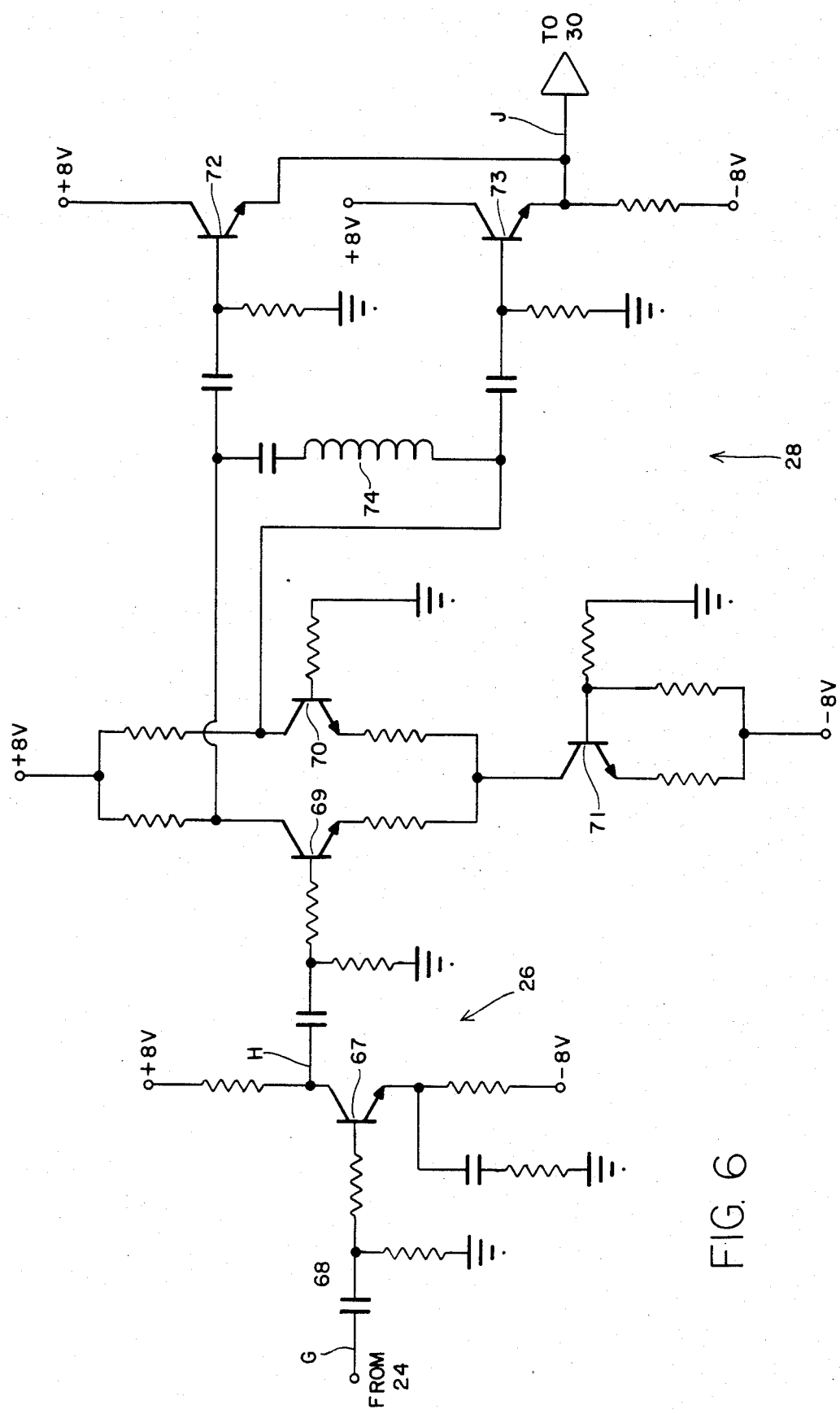
FIG. 6 is a schematic diagram of the first differentiator and the double rectifier elements of the system set forth in FIG. 1.

On FIG. 6, the first differentiator 26 and full wave rectifier 28 are implemented with the components and connections as shown. A transistor 67 and associated circuitry differentiates the luminance transition to provide a first order differentiation pulse depicted as waveform H in FIG. 2. The full wave rectifier 28 is implemented with a phase splitting amplifier comprising two transistors 69 and 70 and a constant current source transistor 71 connected to drive the emitters of both transistors 69 and 70. One phase is provided at the collector of the transistor 69 and the other phase is at the collector of the transistor 70. The full wave rectification function is performed by two transistors 72 and 73 configured as commonly connected emitter followers. The bases of the transistors 72 and 73 are connected respectively to the collectors of the transistors 69 and 70, and are connected together by an inductance-capacitance series network which eliminates undesirable residues of chroma subcarrier present in the luminance path.

Figure 7:
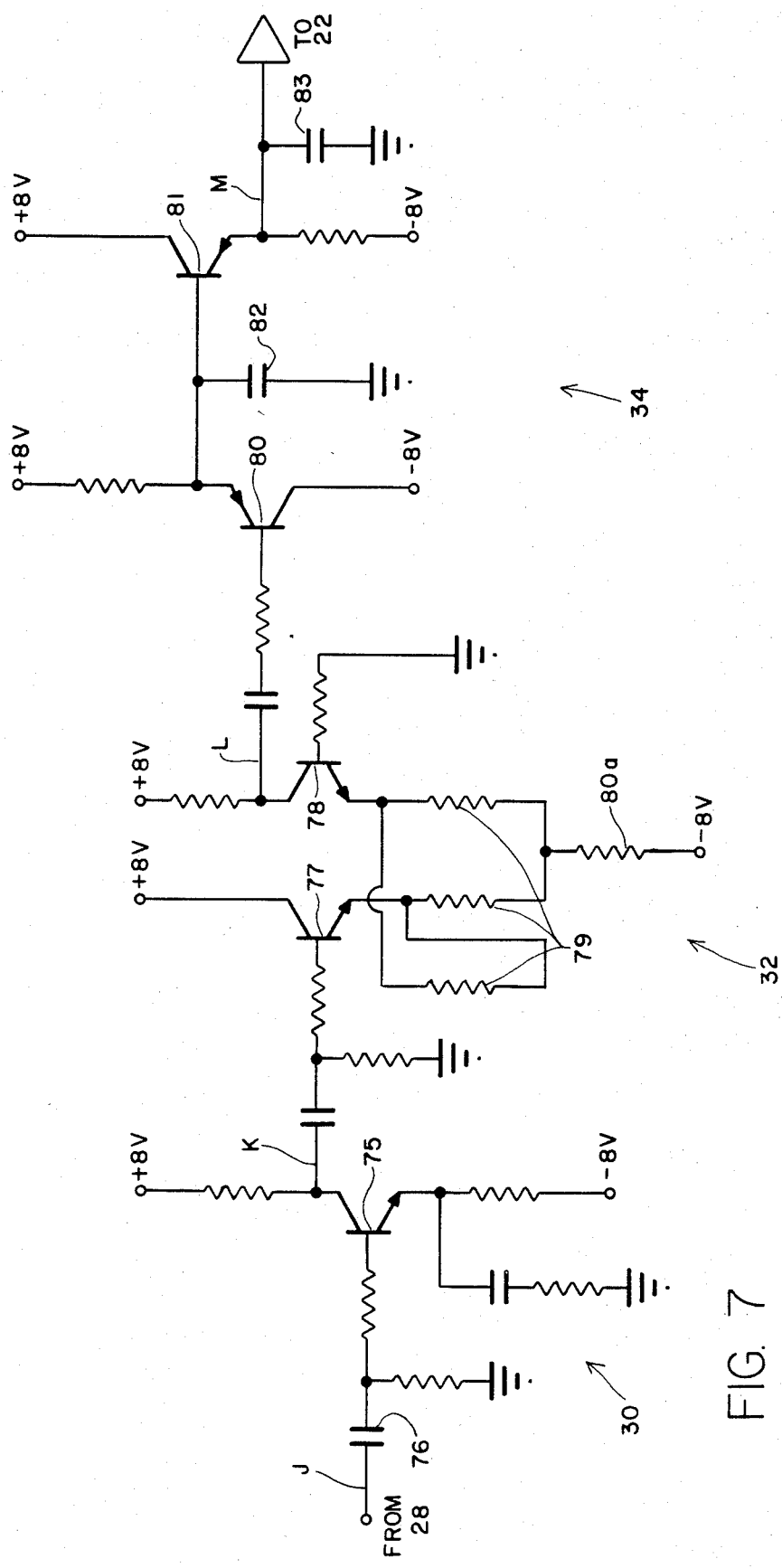
FIG. 7 is a schematic diagram of the second differentiator, limiting amplifier and dual ramp generator elements of the system set forth in FIG. 1.

Circuitry implementing the second differentiator 30, the limiting amplifier 32 and the dual ramp generator 34 is depicted in FIG. 7. Therein, the differentiator 30 is implemented with a transistor 75 and its associated circuitry and operates to submit waveform J to a first order differentiation in order to obtain the "quasi" sinusoidal pulse of waveform K. The limiting amplifier 32 includes two transistors 77 and 78 having their emitters commonly connected in a delta resistance network 79. The resistor 80a adjusts the cutoff limit of the amplifier 32. The dual ramp generator 34 includes two transistors 80 and 81. The transistor 80 is a PNP type configured as a common emitter amplifier. A capacitor 82 connected to the emitter of the transistor 80 controls the positive going slopes of waveform M, and a capacitor 83 connected to the emitter of the NPN transistor 81 controls the negative slope of waveform M. By adjusting the value of the capacitor 83, the negative ramp of waveform M and the resultant bandwidth of the enhanced chroma may be determined. The values shown for the capacitors 82 and 83 will yield a signal having slopes as depicted in waveform M of FIG. 2.

Figure 8:
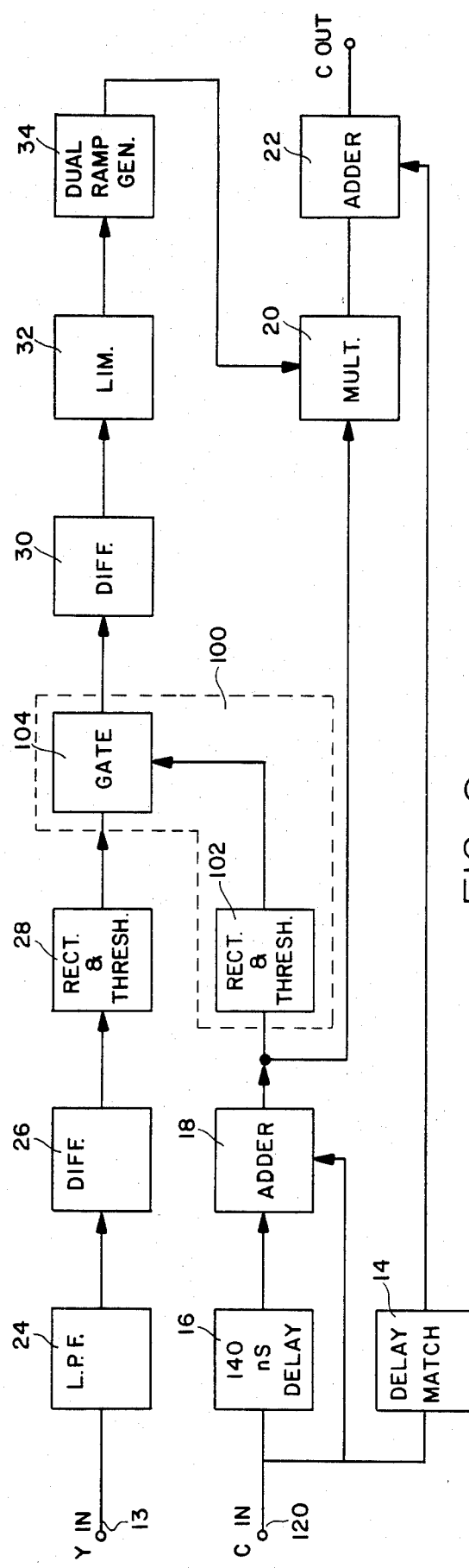
FIG. 8 is a block diagram of an alternative embodiment of a system in accordance with the principles of the present invention.

A second embodiment of a system 10 incorporating the principles of the present invention is depicted in the block diagram of FIG. 8. Therein, elements which are common to the FIG. 1 embodiment of the system bear the same reference numerals. The FIG. 8 embodiment functions identically with the FIG. 1 embodiment under most circumstances.

Occasionally, a chroma transition will not be accompanied by a corresponding luminance transition. The FIG. 8 embodiment accomodates this situation by including a chroma gate subsystem 100 which comprises two functional elements: a full wave rectifier 102, and a gate circuit 104, depicted schematically in FIG. 9. The rectifier 102 receives its input from the output of the adder circuit 18. It full wave rectifies the chroma transition to remove transition direction information.

The rectifier 102 performs a threshold function: only chroma transitions having an absolute value of e.g. 30 IRE units will be sent to the gate circuit 104.

Figure 9:
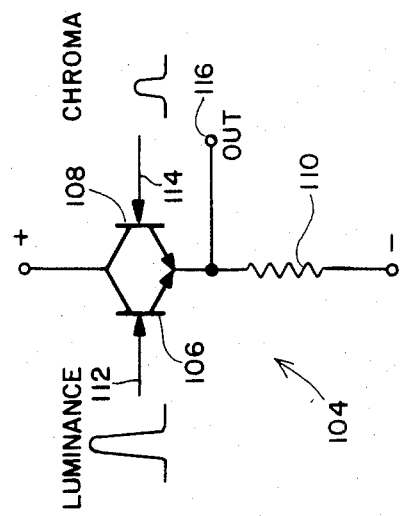
FIG. 9 is an abbreviated schematic diagram of a gate circuit element of the embodiment depicted in FIG. 8.

The gate circuit 104 is preferably implemented as shown in FIG. 9. Therein, two transistors 106 and 108 are commonly connected at both emitter and collector. A common emitter resistor 110 provides output load impedance matching and fixes the gain of the transistor array. Full wave rectified luminance from the rectifier 28 enters the gate 104 at the base 112 of the transistor 106. Full wave rectified chrominance (above the e.g. 30 IRE threshold) enters the gate 104 at the base 114 of the transistor 108. The resultant control signal output is taken at the node 116 of the commonly connected emitters, and it is sent to the differentiator 30 and limiter 32.

The characteristics of the gate 104 are that only the greater one of the signals present simultaneously at the bases 112 and 114 will be selected and put out at the output 116.

The full wave rectified levels of luminance first differentials and chroma transitions are carefully selected in order to favor luminance transitions. In order words, the gate 104 selects the chroma transition only when the luminance transition is lost in noise and the corresponding chrominance transition is very large, such as in excess of 30 IRE units.

Figure 10:
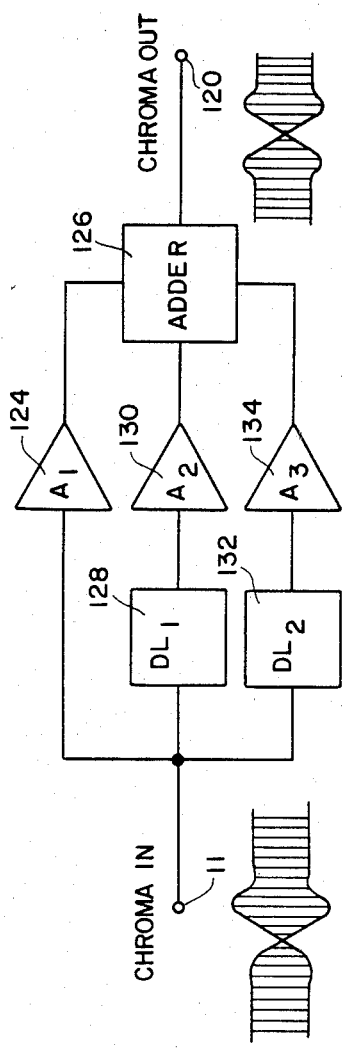
FIG. 10 is a block diagram of a chroma phase equalizer element in accordance with principles of the present invention.

FIG. 10 depicts an active chroma phase equalizer circuit 122 which is interposed between the chroma input 11 and the common node connecting the delay match 14, delay 16 and first adder circuit 18. It may follow the bandpass filter 12, or it may be used in lieu of that filter.

The equalizer 122 includes a first amplifier 124 connected to an adder 126, the output 120 of which is shown connected to the chroma input of the FIG. 8 embodiment. A first delay circuit 128 and a second amplifier 130 are also connected in series between the input 11 and the adder 126. A second delay circuit 132 and third amplifier 134 are likewise connected between the input 11 and the adder circuit 126.

The operation of the equalizer 122 may be better understood by assigning some specific numerical values for its elements. For example, in the case of a 3.58 MHz subcarrier in the NTSC system, waveform E and nothing else will be produced by the combination of elements 124, 128, 130 and 136. This situation presupposes the following conditions: identical gains for adders 124 and 130, and a 140 nanosecond delay path through the delay line 128 and that the output of the amplifier 134 is momentarily disconnected. When the amplifier 134 is reconnected, and when the chroma signal at the input 11 is delayed by an odd number of subcarrier half periods, waveform E will then be added *in phase* to the delayed chroma *before* the transition zero-crossing, and a preshoot will be created. At the same time overshoot and ringing will be reduced. Other numerical values for the elements of the equalizer 122 may also be selected with satisfactory results.

Waveform envelopes of the chrominance modulation are shown adjacent to the input 11 and the output 120 of the equalizer 122. These waveforms show that the equalizer 122 eliminates second order chroma ringing, replaces first order overshoot by a preshoot and an overshoot of equal amplitudes amounting to one half of the original overshoot at the input, and maintains the rise-time at its input value. The chroma sidebands are seen to be manipulated in time but not frequency in order to correct for group delay errors.

A limited amount of band-pass filtering may be tolerated, as the resulting rise-time increase will be compensated in any instance by the subsequent enhancement process, whether controlled by luminance transitions or by the chrominance transition itself in those statistically rare instances when corresponding luminance transitions are not present.

While the apparatus and method of the present invention have been summarized and explained by an illustrative application in chroma enhancement by use of luminance transitions without chroma demodulation, it will be readily apparent to those skilled in the art that many widely varying embodiments and applications are withing the teaching and scope of the present invention, and that the example presented herein is by way of illustration only and should not be construed as limiting the scope of this invention.

I claim:

1. An improved method of enhancing aperiodic transitions occurring in a modulated chroma component of a quadrature modulated color television signal which includes a luminance component and said modulated chroma component by reference to simultaneous aperiodic transitions occurring in said luminance component and without demodulating said modulated chroma component, said method including the steps of:
   (a) deriving a chroma transition envelope signal from a transition of an unenhanced modulated chroma component;
   (b) generating a uniform control signal whose occurence is timed by a transition in said luminance component which occurs substantially simultaneously with said transition of said unenhanced modulated chroma component;
   (c) multiplying said chroma transition envelope signal by said control signal to provide an enhancement product; and
   (d) combining said unenhanced modulated chroma component having said transition in phase with said enhancement product to provide an enhanced modulated chroma component with enhanced transitions characterized by shortened transition time and by alignment with simultaneously occurring transitions in said luminance component.

2. An improved method of enhancing aperiodic transitions occurring in a modulated chroma component of a quadrature modulated color television signal which includes said modulated chroma component and without demodulation thereof, said method including the steps of:
   (a) deriving a chroma transition envelope signal from a transition of an unenhanced modulated chroma component;
   (b) generating a uniform control signal whose occurence is timed by a transition in said unenhanced modulated chroma component;
   (c) multiplying said chroma transition envelope signal by said uniform control signal to provide an enhancement product; and
   (d) combining said unenhanced modulated chroma component having said transition in phase with said enhancement product to provide an enhanced modulated chroma component with enhanced transitions characterized by shortened transition time.

3. An improved method of enhancing aperiodic transitions occurring in a subcarrier containing a modulated chroma component of a quadrature modulated color television signal which includes a luminance component and said modulated chroma component, by reference to simultaneous aperiodic transitions occurring in said luminance component or by reference to transitions in said modulated chroma component when transitions in said luminance component are not effectively present, and without demodulation of the modulated chroma component, said method including the steps of:
   (a) deriving a chroma transition envelope signal from a transition of an unenhanced modulated chroma component;
   (b) generating a uniform control signal whose occurence is timed by one of a corresponding transition occurring in said luminance component and a transition occurring in said unenhanced modulated chroma component when not accompanied by a corresponding transition in said luminance component;
   (c) multiplying said chroma transition envelope signal by said uniform control signal to provide an enhancement product;
   (d) combining in phase said unenhanced modulated chroma component and said enhancement product to provide an enhanced modulated chroma component with enhanced chroma transitions characterized by shortened transition time and by alignment with simultaneously occurring transitions in said luminance component.

4. An improved method of enhancing aperiodic transitions occurring in a subcarrier containing a modulated chroma component of a quadrature modulated color television signal which includes a luminance component and said modulated chroma component, by reference to simultaneous aperiodic transitions occurring in said luminance component or by reference to transitions in said modulated chroma component when transitions in said luminance component are not effectively present, and without demodulation of the modulated chroma component, said method including the steps of:

(a) dividing an unenhanced modulated chroma component into a first part, a second part, and a third part;

(b) delaying the second part by a period equal to one half the period of said subcarrier;

(c) combining the delayed second part and the third part in equal measure so that they phase cancel each other except during transitions in said unenhanced modulated chroma component, thereby yielding a chroma transition envelope signal;

(d) generating a uniform control signal whose occurence is timed by one of a corresponding transition occurring in said luminance component and a transition occurring in said unenhanced modulated chroma component when not accompanied by a corresponding transition in said luminance component;

(e) multiplying said chroma transition envelope signal by said uniform control signal to provide an enhancement product;

(f) combining in phase said first part and said enhancement product to provide an enhanced modulated chroma component with enhanced chroma transitions characterized by shortened transition time and by alignment with simultaneously occurring transitions in said luminance component.

5. The improved method set forth in claim 4 further comprising the step of bandpass filtering said unenhanced modulated chroma component prior to its division into said three parts so as to eliminate ringing and other unwanted artifacts otherwise accompanying transitions therein.

6. The improved method set forth in claims 1, 3 or 4 wherein the step of generating said uniform control signal comprises the steps of:

(a) low pass filtering said luminance component to remove any portions thereof other than aperiodically occurring level transitions therein;

(b) first order differentiating said low pass filtered luminance signal to yield a luminance pulse for each transition;

(c) eliminating the sign of said luminance pulse as by full wave rectifying thereof to render the luminance pulse as an absolute value irrespective of transition direction;

(d) first order differentiating said absolute value luminance pulse to yield two adjacent pulses in opposed magnitude and having a continuous ramp therebetween;

(e) limiting the amplitude of one of the two opposed pulses to a plus unitary value and the other of the two pulses to a minus unitary value irrespective of the original amplitudes thereof;

(f) setting the slope of the ramp between the limited amplitude unitary pulses to yield said uniform control signal.

7. The method set forth in claim 6 wherein said step of eliminating the sign of said luminance pulse includes the step of setting a minimum amplitude threshold for said luminance pulse which must be present before said pulse is put out as an absolute value.

8. The improved method set forth in claim 6 wherein said multiplying step comprises multiplying said chroma transition envelope signal over four quadrants by said plus and minus unitary pulses having a set slope therebetween.

9. The improved method set forth in claim 6 wherein the slope of the ramp between the limited amplitude unitary pulses is made very steep so as to yield a very high resolution in said modulated chroma component.

10. The improved method set forth in claim 6 further comprising the steps of:

(a) full wave rectifying said chroma transition envelope signal to eliminate the sign thereof;

(b) establishing a minimum threshold for said full wave rectified chroma transition envelope signal;

(c) selecting as said control signal said full wave rectified chroma transition envelope signal above said threshold whenever said differentiated, absolute value luminance pulse is not effectively present at a level above noise.

11. The improved method set forth in claim 10 wherein said step of establishing a minimum threshold for said full wave rectified chroma transition envelope comprises setting the threshold in a range between 10 and 50 IRE units.

12. Improved apparatus for enhancing aperiodic transitions in a modulated chroma component contained in a subcarrier of a quadrature modulated color television signal including a luminance component and said modulated chroma component, by use of a uniform control signal timed by simultaneously occurring aperiodic transitions occurring in said luminance component or by transitions in said modulated chroma component when simultaneously occurring transitions in said luminance component are not effectively present, and without demodulation of said modulated chroma component, said apparatus comprising:

(a) an input receiving an unenhanced modulated chroma component;

(b) delay matching means connected to said input for delaying a first part of said unenhanced modulated chroma component by a predetermined amount;

(c) one half period delay means connected to said input for delaying a second part of said unenhanced modulated chroma component by one half the period of said subcarrier;

(d) first adder means connected to said input and said one half period delay means for combining in equal measure a third part of said unenhanced modulated chroma component with said delayed second part thereof, thereby yielding a transition envelope signal;

(e) control generation means connected to receive said luminance component and said unenhanced modulated chroma component and to generate said control signal as a uniform function timed by a transition occurring in one of said luminance component and said unenhanced modulated chroma component with preference given to the luminance transition, if present;

(f) multiplier means connected to said first adder means and to said control generation means for multiplying said transition envelope signal by said control to provide an enhancement product; and, (g) second adder means connected to said delay matching means and to said multiplier means for combining said delay matched first part in phase with said enhancement product in order to put out an enhanced modulated chroma component having time-shortened transitions which are in alignment with simultaneous transitions occurring in said luminance component.

13. The improved apparatus set forth in claim 12 further comprising band pass filter means connected at said input, for bandpass filtering said unenhanced chroma component prior to its division into said three parts in order to eliminate ringing and other unwanted artifacts otherwise accompanying transitions therein.

14. The improved apparatus set forth in claim 12 wherein said control generation means comprises:

(a) low pass filter means connected to receive said luminance component for removing therefrom any portions thereof other than aperiodically occurring level transitions therein;

(b) first order differentiation means connected to said low pass filter means for first order differentiating said low pass filtered luminance signal to yield a luminance pulse for each transition;

(c) first sign elimination means connected to said first order differentiation means for eliminating the sign of said luminance pulse as by full wave rectification thereof to render said luminance pulse as an absolute value irrespective of transition direction;

(d) second sign elimination means connected to said first adder means for eliminating the sign of said chroma transition envelope signal as by full wave rectification thereof to render said chroma transition envelope signal as an absolute value irrespective of transition direction and for establishing a predetermined amplitude threshold therefor;

(e) gate means connected to said first and second sign elimination means for putting out said absolute value luminance pulse when it is present at a level above noise and for putting out said absolute value chroma transition envelope signal whenever a luminance pulse is not effectively simultaneously present;

(f) second first order differentiation means connected to said sign elimination means for first order differentiating the signal put out by said gate means to yield two adjacent pulses in opposed magnitude and having a continuous ramp therebetween;

(g) limiting amplifier means connected to said second first order differentiation means for limiting the amplitude of one of the two opposed pulses to a plus unitary value and the other of the two pulses to a minus unitary value, irrespective of the original amplitudes thereof;

(h) dual ramp generator means connected to said limiting amplifier means for setting the slope of the ramp between the limited amplitude unitary pulses to yield said uniform control.

15. The improved apparatus set forth in claim 14 wherein said first sign elimination means includes threshold setting means for setting a minimum amplitude threshold for said luminance pulse which must be present before said luminance pulse is put out as an absolute value.

16. The improved apparatus set forth in claim 12 wherein said multiplier means comprises a four quadrant multiplier connected to multiply said chroma transition envelope by said control over four quadrants.

17. The improved apparatus set forth in claim 12 further comprising active chroma phase equalization means connected at said input, for phase equalizing said unenhanced chroma component prior to its division into said three parts in order to eliminate second order chroma ringing, to replace first order overshoot by a preshoot and an overshoot of equal amplitudes which are equal to half of the uncorrected overshoot present at the input, and to maintain rise-time at its input value without degradation of input bandwidth.

18. Improved apparatus for enhancing aperiodic transitions in a modulated chroma component contained in a subcarrier of a quadrature modulated color television signal including said modulated chroma component, by use of a uniform control signal timed by transitions in said modulated chroma component, and without demodulation of said modulated chroma component, said apparatus comprising:

(a) an input receiving an unenhanced modulated chroma component;

(b) delay matching means connected to the input for delaying a first part of said unenhanced modulated chroma component by a predetermined amount;

(c) one half period delay means connected to said input for delaying a second part of said unenhanced modulated chroma component by one half the period of said subcarrier;

(d) first adder means connected to said input and to said one half period delay means for combining in equal measure a third part of said unenhanced modulated chroma component with said delayed second part thereof, thereby yielding a transition envelope signal;

(e) control generation means connected to said first adder means for generating said uniform control signal whose occurence is timed by said transition envelope signal;

(f) multiplier means connected to said first adder means and to said control generation means for multiplying said transition envelope signal by said uniform control signal to provide an enhancement product; and (g) second adder means connected to said delay matching means and to said multiplier means for combining said delay matched first part of said modulated chroma component in phase with said enhancement product to put out an enhanced modulated chroma signal with time-shortened transitions and without demodulation thereof.

19. The improved apparatus set forth in claim 18 wherein said control generation means comprises:

(a) sign elimination means connected to said first adder means for eliminating the sign of said transition envelope signal and render it as an absolute value irrespective of transition direction;

(b) first order differentiation means connected to said sign elimination means for first order differentiating said absolute value transition envelope to yield two adjacent pulses in opposed magnitude and having a continuous ramp therebetween;

(c) limiting amplifier means connected to said first order differentiation means for limiting the amplitude of one of the two opposed pulses to a plus unitary value and the other of the two pulses to a minus unitary value irrespective of the original amplitudes thereof;

(d) dual ramp generator means connected to said limiting amplifier means for setting the slope of the ramp between the limited amplitude unitary pulses to yield said uniform control signal.

20. The improved apparatus set forth in claim 19 wherein said sign elimination means further includes threshold setting means for setting a predetermined minimum amplitude threshold for said transition envelope signal.

21. The improved apparatus set forth in claim 18 wherein said multiplier means comprises a four quadrant multiplier connected to multiply said transition envelope signal by said control signal over four quadrants.

22. The improved apparatus set forth in claim 18 further comprising active chroma phase equalization means connected at said input, for phase equalizing said unenhanced modulated chroma component prior to its division into said three parts to eliminate second order chroma ringing, to replace first order overshoot with a preshoot and an overshoot of equal amplitudes at one half the amplitude of the original overshoot present at said input and to maintain the rise-time at its input value without bandwidth degradation.

23. Improved apparatus for enhancing aperiodic transitions in a modulated chroma component contained in a subcarrier of a quadrature modulated color television signal including a luminance component and said modulated chroma component, by use of a uniform control signal and without demodulation of said modulated chroma component, said apparatus comprising:

(a) an input receiving an unenhanced modulated chroma component;

(b) delay matching means connected to said input for delaying a first part of said unenhanced modulated chroma component by a predetermined amount;

(c) one half period delay means connected to said input for delaying a second part of said unenhanced modulated chroma component for one half the period of said subcarrier;

(d) first adder means connected to said input and to said one half period delay means for combining in equal measure a third part of said unenhanced modulated chroma component with said delayed second part thereof, thereby yielding a transition envelope signal;

(e) control generation means connected to receive said luminance component and to generate said uniform control signal whose occurence is timed by each aperiodic transition in said luminance component occurring substantially simultaneously with transitions in said unenhanced modulated chroma component;

(f) multiplier means connected to said first adder means and to said control generation means for multiplying said transition envelope signal by said uniform control signal to provide an enhancement product; and, (g) second adder means connected to said delay matching means and to said multiplier means for combining said delay matched first part of said unenhanced modulated chroma component in phase with said enhancement product to yield an enhanced modulated chroma component with shortened transitions which are in alignment with simultaneous transitions occuring in said luminance component.

24. The improved apparatus set forth in claim 23 further comprising band pass filter means connected at said input, for bandpass filtering said unenhanced modulated chroma component prior to its division into said three parts to eliminate ringing and other unwanted artifacts otherwise accompanying transitions therein.

25. The improved apparatus set forth in claim 23 wherein said control generation means comprises:

(a) low pass filter means connected to receive said luminance component for removing therefrom any portions other than aperiodically occurring level transitions therein;

(b) first order differentiation means connected to said low pass filter means for first order differentiating said low pass filtered luminance signal to yield a luminance pulse for each transition;

(c) sign elimination means connected to said first order differentiation means for eliminating the sign of said luminance pulse as by full wave rectification thereof to render said luminance pulse as an absolute value irrespective of transition direction;

(d) second first order differentiation means connected to said sign elimination means for first order differentiating said absolute value luminance pulse to yield two adjacent pulses in opposed magnitude and having a continuous ramp therebetween;

(e) limiting amplifier means connected to said second differentiation means for limiting the amplitude of one of the two opposed pulses to a plus unitary value and the other of the two pulses to a minus unitary value irrespective of the original amplitudes thereof;

(f) dual ramp generator means connected to said limiting amplifier means for setting the slope of the ramp between the limited amplitude unitary pulses to yield said uniform control signal.

26. The improved apparatus set forth in claim 25 wherein said sign elimination means further includes threshold setting means for setting a minimum amplitude threshold for said luminance pulse which must be present before said pulse is put out as an absolute value.

27. The improved apparatus set forth in claim 23 wherein said multiplier means comprises a four quadrant multiplier connected to multiply said transition envelope by said control over four quadrants.

28. The improved apparatus set forth in claim 23 further comprising active chroma phase equalization means connected at said input, for phase equalizing said unenhanced modulated chroma component prior to its division into said three parts to eliminate second order chroma ringing, to replace first order overshoot with a preshoot and an overshoot of equal amplitudes at one half the amplitude of the original overshoot present at the input and to maintain the rise-time at its input value without bandwidth degradation.

29. Improved apparatus for enhancing aperiodic transitions in a modulated chroma component contained in a subcarrier of a quadrature modulated color television signal including a luminance component and said modulated chroma component, by use of a uniform control signal whose occurence is timed by simultaneously occurring aperiodic transitions in said luminance component (and alternatively by transitions in said modulated chroma component when simultaneously occurring transitions in said luminance component are not effectively present), and without demodulation of said modulated chroma component, said apparatus comprising:

(a) an input receiving an unenhanced modulated chroma component;

(b) delay matching means connected to said input for delaying a first part of said unenhanced modulated chroma component by a predetermined amount;

(c) transition envelope derivation means connected to said input for deriving a transition envelope signal from said unenhanced modulated chroma component;

(d) control generation means connected to receive said luminance component and said unenhanced modulated chroma component and to generate a control signal as a uniform function timed by a transition occurring in one of said luminance component and modulated chroma component with preference given to the luminance transition, if present;

(e) multiplier means connected to said transition envelope derivation means and to said control generation means for multiplying said transition envelope signal by said control signal to provide an enhancement product; and, (f) adder means connected to said delay matching means and to said multiplier means for combining said delay matched first part in phase with said enhancement product in order to put out an enhanced modulated chroma component having time-shortened transitions which are in alignment with simultaneous transitions occurring in said luminance component.

30. The improved apparatus set forth in claim 29 further comprising band pass filter means connected at said input, for bandpass filtering said unenhanced chroma component.

31. The improved apparatus set forth in claim 29 further comprising active chroma phase equalization means connected at said input, for phase equalizing said unenhanced chroma component in order to eliminate second order chroma ringing, to replace first order overshoot by a preshoot and an overshoot of equal amplitudes which are equal to half of the uncorrected overshoot present at the input, and to maintain rise-time at its input value without degradation of input bandwidth.

32. The improved apparatus set forth in claim 29 wherein said control generation means comprises:

(a) low pass filter means connected to receive said luminance component for removing therefrom any portions thereof other than aperiodically occurring level transitions therein;

(b) first order differentiation means connected to said low pass filter means for first order differentiating said low pass filtered luminance signal to yield a luminance pulse for each transition;

(c) first sign elimination means connected to said first order differentiation means for eliminating the sign of said luminance pulse as by full wave rectification thereof to render said luminance pulse as an absolute value irrespective of transition direction;

(d) second sign elimination means connected to said transition envelope derivation means for eliminating the sign of said chroma transition envelope signal as by full wave rectification thereof to render said chroma transition envelope signal as an absolute value irrespective of transition direction and for establishing a predetermined amplitude threshold therefor;

(e) gate means connected to said first and second sign elimination means for putting out said absolute value luminance pulse when it is present at a level above noise and for putting out said absolute value chroma transition envelope signal whenever said luminance pulse is not effectively simultaneously present;

(f) second first order differentiation means connected to said sign elimination means for first order differentiating the signal put out by said gate means to yield two adjacent pulses in opposed magnitude and having a continuous ramp therebetween;

(g) limiting amplifier means connected to said second first order differentiation means for limiting the amplitude of one of the two opposed pulses to a plus unitary value and the other of the two pulses to a minus unitary value, irrespective of the original signal amplitudes thereof; and (h) dual ramp generator means connected to said limiting amplifier means for setting the slope of the ramp between the limited unitary pulses to yield said uniform control.

33. The improved apparatus set forth in claim 32 wherein said first sign elimination means includes threshold setting means for setting a minimum amplitude threshold for said pulse which must be present before said pulse is put out as an absolute value.

34. The improved apparatus set forth in claim 29 wherein said multiplier means comprises a four quadrant multiplier connected to multiply said transition envelope by said control over four quadrants.

* * * * *